United States Patent [19]

Bertrams, deceased et al.

[11] 4,105,099
[45] Aug. 8, 1978

[54] VOLTAGE RAIL

[75] Inventors: Johannes Kurt Bertrams, deceased, late of Hilden, Germany; by Casper Antonius Henricus Mulkens, administrator, Eindhoven, Netherlands

[73] Assignee: U.S. Philips Corporation, New York, N.Y.

[21] Appl. No.: 811,614

[22] Filed: Jun. 30, 1977

Related U.S. Application Data

[63] Continuation of Ser. No. 340,767, Mar. 13, 1973, abandoned.

[30] Foreign Application Priority Data

Mar. 18, 1972 [NL] Netherlands .................... 7203660

[51] Int. Cl.$^2$ ............................................ B60M 1/34
[52] U.S. Cl. ......................... 191/29 DM; 339/22 T; 339/112 R
[58] Field of Search ............... 191/22, 23, 25, 29, 191/30, 31; 174/99; 339/21 R, 22 R, 22 T, 112 R

[56] References Cited

U.S. PATENT DOCUMENTS 3,341,648  9/1967  Melstedt et al. .................... 13/20

FOREIGN PATENT DOCUMENTS 1,261,306  4/1961  France.
1,490,596  8/1970  Fed. Rep. of Germany.

Primary Examiner—Richard A. Bertsch
Attorney, Agent, or Firm—Frank R. Trifari; David R. Treacy

[57] ABSTRACT

A voltage rail comprising an elongated support of an insulating synthetic material manufactured by extrusion and in which two or more elongated slots are recessed. A current conductor is accommodated in each slot, and separated from the support material by a thin heat-resistant foil. Preferably, between the slots the support is a thin-walled hollow structure.

10 Claims, 2 Drawing Figures

VOLTAGE RAIL

This is a continuation of application Ser. No. 340,767, filed Mar. 13, 1976 and now abandoned.

The invention relates to a voltage rail comprising an elongate support of insulating synthetic material manufactured by extrusion, and at least two current conductors incorporated in slots which are recessed in the support and which are accessible for contact members associated with on a current consumer which is suitable for connection to the voltage rail. Such a voltage rail is known inter alia from the French Patent Specification No. 1,261,306.

In this known voltage rail, the support is formed by a rather flat flexible band of an insulating synthetic material, which band shows a number of grooves which extend in the longitudinal direction of the band and in which the current conductors are incorporated. Due to its design the band is so easily deformed that in the mounted condition it must be supported substantially throughout its length. In the known voltage rail this structural support is provided by a metal sheath-like member which is provided with two hooked edges which engage projections on the band.

Such a metal sheath-like supporting member would not be necessary if the support of snythetic material itself would show a large resistance against bending. This large resistance against bending can be achieved of course by ensuring that the support has large transverse dimensions. However, a large cross-section involves the drawback that much material is required.

It is the object of the invention to provide a voltage rail which does not exhibit these drawbacks.

For that purpose, the voltage rail according to the invention is characterized in that at least the supporting material occurring in the zone between the slots is thin-walled and encloses at least one cavity. As a result of this, a voltage rail is realized with little material which is nevertheless readily resistant to bending.

In a preferred embodiment of the voltage rail according to the invention a thin, elongated strip of refractory i.e. heat resistant material is present in each slot between the current conductor and the support material. This strip of heat resistant material protects the support material from high temperatures. As a result of this the dimensions of the voltage rail may be chosen to be small.

Furthermore, the outer surface of each of the current conductors on its side opposite to the entrance to the slot is preferably provided with a gutter to receive an adhesive. In assembling the current conductor in the support, a suitable adhesive will serve as a lubricant and thus facilitate the insertion of the conductor. The adhesive will then penetrate into any chinks alonside the gutter between the current conductor and the support material so that good adhesion is obtained.

In further preferred embodiment to the invention in which the voltage rail is closed on at least one end by an end cap, the end cap including at least one projection which fits in the cavity formed by the support material. The end cap may be formed by a closing element, by an element which produces the connection between two voltage rails or by a current supply element. In such a current supply element, pins which can contact the current conductors are provided beside the said projections.

The invention will be described in greater detail with reference to a drawing of an embodiment of the voltage rail according to the invention. In the drawing.

Figure 1:
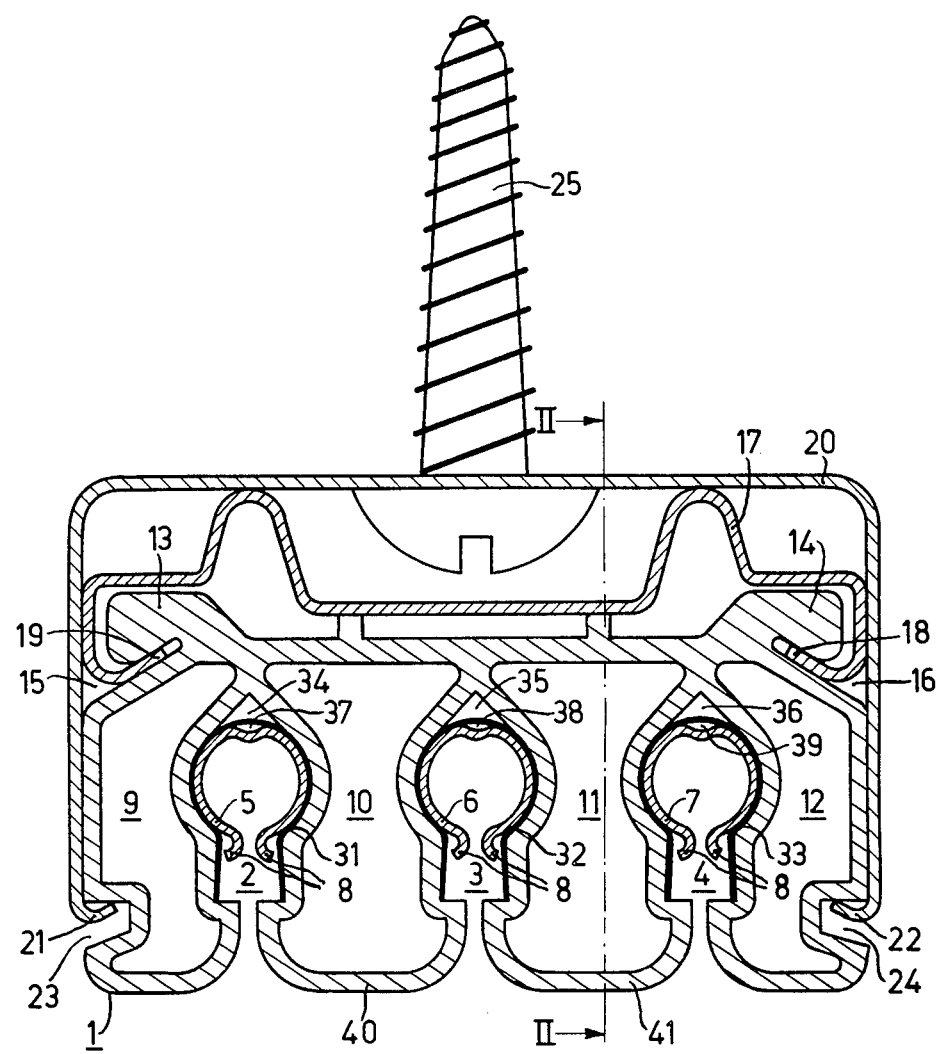
FIG. 1 is a cross-sectional view of the voltage rail.
Figure 2:
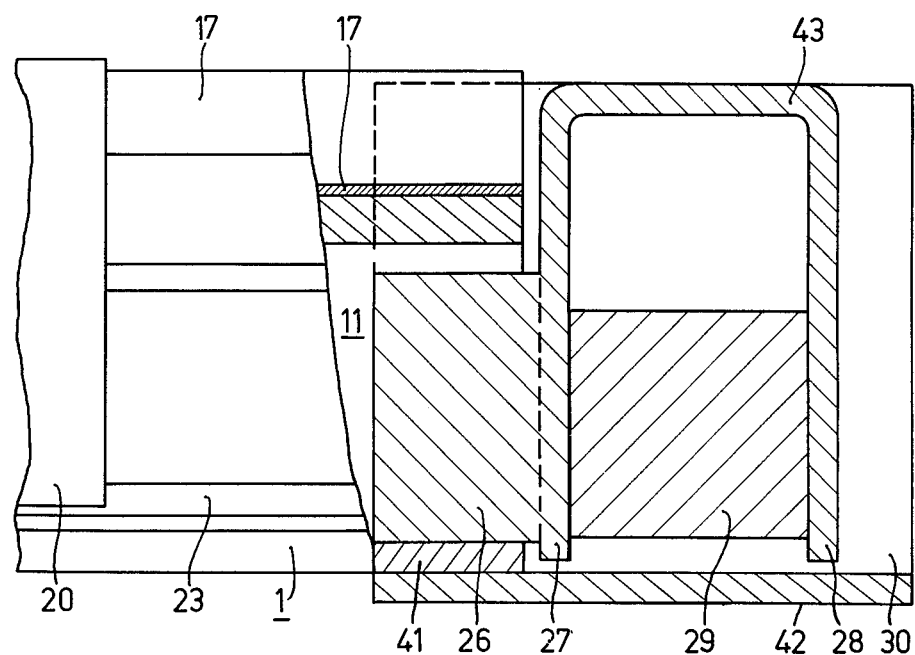
FIG. 2 is a side elevation of the voltage rail of which the end, as well as a closing element provided on the voltage rail, are shown as a cross-section taken on the line II—II of FIG. 1.

The voltage rail comprises a support 1 of an insulating synthetic material in which three slots 2, 3 and 4 are recessed. In said slots are accomodated the current conductors 5, 6 and 7 which in this embodiment have a $\Omega$-like cross-section. The current conductors 5, 6 and 7 can be connected to contact members occurring on a current consumer suitable for co-operation with said current rail. For that purpose, the contact members which, for example, are constructed as knife contacts, must each be inserted into one of the slots 2, 3 or 4. To facilitate insertion edges 8 of the current conductors are bend slightly outwards.

Each of the current conductors 5, 6 and 7 is surrounded by a thin elongated heat resistant foil 31, 32 and 33, for example polyurethane, or polyester enveloped by presspane, a fibrous material impregnated with phenolformaldehyde, respectively, which protect the support material from high temperatures. The support material furthermore comprises longitudinally extending gutters 34, 35 and 36 adjoining the foil while longitudinally extending gutter-like recesses 37, 38 and 39 are provided in the outer surface of the current conductors opposite the support gutters and adjoining the foil. These gutters and recesses are filled with an adhesive, for example, a suitable synthetic resin. During assembly of the heat resistant foil around the conductor and the conductor with the foil in the support material, the adhesive in the still liquid state is provided in the respective gutters. During and after assembly the adhesive will penetrate into the chinks on either side of the gutters and harden by drying or polymerization. A very good adhesion throughout the length of the voltage rail is realized thereby.

The support 1 furthermore comprises a number of enclosed cavities 9, 10, 11 and 12 recessed in the support material, as a result of which a light-weight construction is obtained. As shown in the drawing, the material of the support is thin-walled. The upper side of the support comprises two flanges 13 and 14 which constitute slots 15 and 16, respectively. The grounding strip 17 is clamped in said slots by its edges 18 and 19.

The voltage rail can be connected against a wall or ceiling by means of a screw 25 and a brace 20 the bent edges 21 and 22 of which engage with grooves 23 and 24 recessed in the sidewalls of the support.

The end of the voltage rail is closed by means an end cap which comprises a U-shaped member 43 of an electrically insulating material, which member is provided with two projections 26 fitting in the cavities 10 and 11, respectively, in the support.

The limbs 27 and 28 of the U-shaped member 43 are connected by an intermediate member 29. The U-shaped member 25 and the cut end of the voltage rail are surrounded by an element 30 which is likewise in the form of a U and the bottom portion 42 of which is shaded. Element 30 is secured to the intermediate member 29 by means of a screw (not shown). By rigidly tightening said screw, the wall portions 40 and 41 of the voltage rail are clamped between the studs 26 and the bottom portion 42 of the U-shaped element 30. In this manner simple and good connection is obtained not only for the edge cap shown but also for an element which produces the coupling of two voltage rails or for a current supply element.

In this embodiment the voltage rail is provided with a plate-shaped grounding strip 17. Of course, one of the current conductors may also be used as a grounding strip. It is furthermore to be noted that the voltage rail according to the invention is not restricted to the type shown in this embodiment having three current conductors; voltage rails having two or more than three current conductors are also feasible.

What is claimed is:

1. A voltage rail comprising an elongated support of insulating synthetic material, at least two accessible slots recessed in said support, an elongated current conductor carried in each of said slots for cooperating with contact members of a current consumer when inserted in said slots, and a thin elongated foil of heat resistant material in each slot between said current conductor and the support material.

2. A voltage rail is claimed in claim 1, wherein said heat resistant foil is a polyurethane foil.

3. A voltage rail as claimed in claim 1, wherein said support includes at least one hollow section formed of said support material, each respective pair of adjacent slots being separated by a hollow section, said hollow sections having at least one enclosed longitudinal cavity formed therein.

4. A voltage rail as claimed in claim 1, wherein said conductors have an outer surface about which said foil is placed, said surface including a longitudinally extending gutter, said gutter containing an adhesive between the conductor and the foil.

5. A voltage rail as claimed as claim 1, wherein said support slot has a longitudinally extending gutter opposite an accessible side of the slot, said gutter containing an adhesive between the support material and the foil.

6. A voltage rail as claimed in claim 1, wherein said rail includes at least one gutter extending longitudinally adjoining the foil, said gutter containing an adhesive.

7. A voltage rail as claimed in claim 6, wherein said adhesive additionally extends into at least some chinks on either side of the gutter.

8. A voltage rail as claimed in claim 7 wherein said conductor and said support slot each include a gutter placed opposite each other.

9. A voltage rail comprising an elongated support of insulating synthetic material, at least two accessible slots recessed in said support, a current conductor carried in each of said slots for cooperating with contact members of a current consumer when inserted in said slots, said slots being separated by hollow sections of said support material, said hollow sections having at least one enclosed longitudinal cavity formed therein, said voltage rail further comprising a recess in the circumferential surface of said current conductor on a side thereof opposite the accessible side of said slot so as to form a gutter for receiving an adhesive.

10. A voltage rail comprising an elongated support of insulating synthetic material, at least two accessible slots recessed in said support, a current conductor carried in each of said slots for cooperating with contact members of a current consumer when inserted in said slots, said slots being separated by hollow sections of said support material, said hollow sections having at least one enclosed longitudinal cavity formed therein, and a strip of heat resistant material in each slot between said current conductor and the support material; and further comprising an end cap closing at least one end of said voltage rail, said end cap comprising at least one projection inserted into a respective enclosed cavity.

* * * * *